United States Patent Office 2,946,781
Patented July 26, 1960

2,946,781
PROCESS FOR THE PREPARATION OF ADENOSYL HOMOCYSTEINE

Clifford H. Shunk, Westfield, N.J., and John W. Richter, Wilmington, Del., assignors to Merck & Co., Inc., Rahway, N.J., a corporation of New Jersey No Drawing. Filed Feb. 6, 1957, Ser. No. 638,432

7 Claims. (Cl. 260—211.5)

The present invention relates to an improved process for the preparation of adenosyl homocysteine.

Adenosyl homocysteine is a substance which has been prepared enzymatically by Cantoni, J. Am. Chem. Soc., 74, 2942 (1952); J. Biol. Chem., 189, 203 (1951); ibid., 189, 745 (1951); and ibid., 204, 407 (1953). It has also been prepared chemically by Baddiley and Jamieson, J. Chem. Soc., April 1955, p. 1085.

The structural formula of adenosyl homocysteine can be represented as follows:

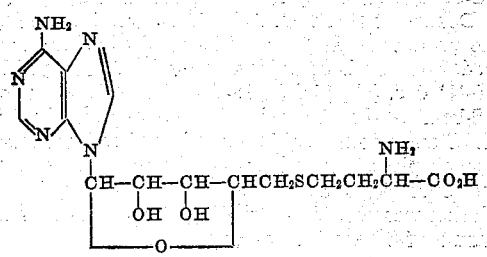

Adenosyl homocysteine can be employed in the preparation of so-called "active methionine," a product having potentialties as a lipotropic agent, i.e., in the treatment of various liver diseases.

While methods for preparing adenosyl homocysteine are known, as aforesaid, these methods leave much to be desired. The enzymatic method is merely of academic interest, the yield and hence the cost of the product being such as to render that method of no interest as a source of substantial quantities of the product. Nor does the known chemical process materially improve the situation, as it is quite cumbersome and the yields also are low.

It is an object of this invention to provide a technically-simple and commercially-feasible process for preparing adenosyl homocysteine in good yields.

A further object of our present invention is to provide adenosyl homocysteine substantially in the form of adenosyl-L-homocysteine, which permits the subsequent obtaining of "active methionine" having biological activity twice as great as that of "active methionine" heretofore produced by chemical methods.

Other objects will become apparent from the following description.

We have attained the foregoing and other objects in accordance with the present invention by contacting the products obtained by hydrolyzing the reaction product of 2',3'- isopropylidene-5' - p - toluenesulfonyl adenosine and a salt of L-homocysteine with a suitable anion exchange substance and eluting adenosyl homocysteine from the anion exchange substance.

The reaction of 2',3'-isopropylidene-5'-p-toluenesulfonyl adenosine and homocysteine has already been suggested. However, the desired adenosyl-homocysteine was obtained only after a circuitous path was followed. This path involved dissolving the solvent-freed reaction products in water; filtering off the unchanged homocysteine reactant; removing sodium ions by ion exchange and elution; passing the resulting concentrated eluate over another ion exchange resin to remove toluene-p-sulfonate ions; eluting, drying the resulting eluate, hydrolyzing the resulting solid product; treating the hydrolysis product with barium hydroxide to remove sulfuric acid; filtering barium sulfate; and recrystallizing the concentrated filtrate.

In carrying out the process of our invention, we prefer to employ homocysteine in the L-form and, desirably, in the form of its di-sodium salt. While racemic homocysteine may also be used in accordance with our present process, the adenosyl homocysteine obtained thereby, after conversion to "active methionine," yields a product having only about one-half the biological potency of that obtainable when the L-form of homocysteine is used.

The reaction of 2',3'-isopropylidene-5'-p-toluenesulfonyl adenosine and the homocysteine may be conducted in known manner. We have obtained advantageous results by forming the di-sodium salt of L-homocysteine in situ by dissolving S-benzyl-L-homocysteine in anhydrous liquid ammonia, adding sodium carefully and with agitation until a permanent blue color is obtained and then de-colorizing with additional S-benzyl-L-homocysteine in order to insure against the presence of any excess of sodium.

In hydrolyzing the reaction products obtained by the treatment of 2',3'-isopropylidene-5'-p-toluenesulfonyl adenosine and homocysteine, we have found that the conditions may be rather widely varied, as to hydrolyzing agents and conditions employed. Any strong mineral acid may be used to assist the hydrolysis. Examples of such acids which may be employed include sulfuric acid, hydrochloric acid, perchloric acid and phosphoric acid. The normality of the reaction contents undergoing hydrolysis at the beginning of this step is desirably 1 N; but this normality may be raised or lowered, if desired. The temperature at which the hydrolysis reaction is conducted may be room temperature, i.e., about 25° C., but this may be raised or lowered, if desired. The time required for the desired hydrolysis will, of course, vary with the acid strength, concentration of acid and reactants, and with the temperature at which the hydrolysis is conducted. We have found that, in general, twenty-four hours at 25° C. is sufficient to carry out the desired reaction.

We may employ as anion exchange resins in accordance with our invention any high molecular weight substance, insoluble in water, containing a strongly basic, postively charged functional group bound thereto and a mobile, negatively charged ion. We prefer to use the anion exchange resins of commerce having a strong N-containing basic functional group, e.g., R—N$_+$(R$_1$R$_2$R$_3$), where each R is an organic group such as alkyl and may be the same or different.

The particular nature of the base material from which the anion exchange resin is prepared is not critical. Thus, a basic anion exchange resin prepared from guanidine and formaldehyde or from styrene-divinylbenzene copolymers may be used, and the polar group may be introduced prior or subsequent to resin formation. For example, the basic N-containing functional group is introduced into styrene-divinylbenzene copolymers, subsequent to the formation of the copolymers, by chloromethylation and subsequent amination with a trialkyl amine. If desired, the quaternary amine group may be incorporated by reacting a tertiary amine resin with an epoxide, such as ethylene oxide.

Among the specific anion exchange resins containing quaternary amine, strongly basic, positively charged high molecular weight portions which have been used on the hydroxyl cycle, in accordance with the present invention, are the ones tabulated below.

| Name | Manufacturer | Total Capacity M.e.[1]/g. | M.e.[1]/ml. |
|---|---|---|---|
| Amberlite IRA-400 | Rohm & Haas, Philadelphia, Pa. | 2.3 | 1.0 |
| Amberlite IRA-410 | do | 2.5 | 1.0 |
| Amberlite XE-67 | do | | |
| Amberlite IRA-411 | do | | |
| Dowex-1 | Dow Chemical, Midland, Mich. | 2.4 | 1.0 |
| Dowex-2 | do | | |
| Permutit S | Permutit, New York, N.Y. | 2.3 | 0.9 |

[1] Milliequivalents.

As eluants, to remove the adenosyl-homocysteine from the anion exchange substance, we may employ any weak acid, such as acetic acid, propionic acid, butyric acid or the like.

With respect to the anion exchange substances and eluants used in accordance with this invention, we follow conventional practice as regards the procedures and techniques employed.

The following example is given by way of illustration and not by way of limitation. The degrees are on the centigrade scale.

EXAMPLE I (a) *Preparation of 2',3'-isopropylidene-5'-p-toluene-sulfonyl adenosine*

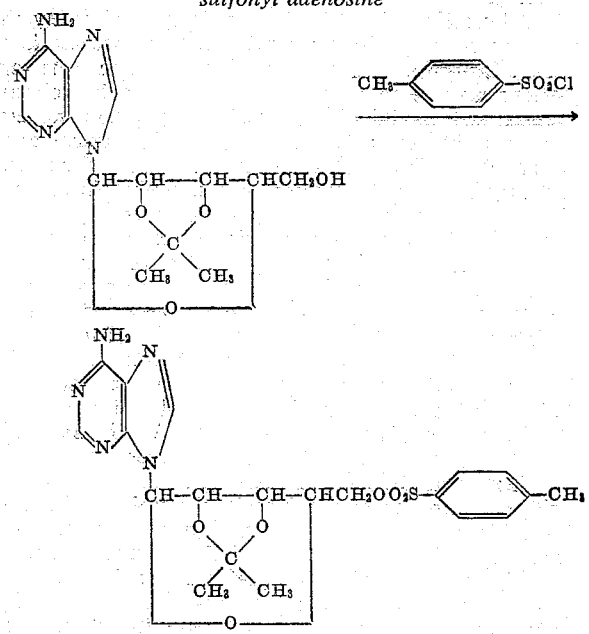

Anhydrous 2',3'-isopropylidene adenosine (11.7 g.) was dissolved in 125 ml. of anhydrous pyridine with slight warming and then the solution was cooled in an ice bath. To this solution, 8.0 g. of p-toluenesulfonyl chloride was added with shaking. This mixture was kept at room temperature (25° C.) for ten hours. Fifty ml. of water followed by 500 ml. of an ice-cold, saturated solution of sodium bicarbonate was added to the reaction mixture. The cloudy mixture was extracted three times with 500 ml. portions of cold chloroform. The combined chloroform extracts were washed twice with one l. portions of an ice-cold, saturated solution of sodium bisulfae and then twice with one l. portions of cold water. The yellow, chloroform solution was dried rapidly by shaking with anhydrous magnesium sulfate, filtered, and then concentrated under reduced pressure to a volume of 200 ml. Petroleum solvent (B.P. 85.5–100°) (Skelly Solve C) was added slowly to the concentrated, chloroform solution and the mixture was cooled and scratched to start crystallization. After 400 ml. of the petroleum solvent had been added, the mixture was kept in the ice-box overnight. The colorless needles were collected on a filter and washed with petroleum ether (B.P. 30–60°); weight 11 g. (63%). They underwent a change in crystalline structure at about 120° C. and then melted with decomposition at 290°–295° C. on a Köfler micro hot stage. Some of the colorless product was dried at 78° C. under 0.1 mm. of mercury pressure for four hours and some was dried under the same vacuum at 110° C. for one hour. Material dried at 78° C./0.1 mm. for four hours gave a strong Beilstein test for halogen and showed an analysis indicative of chloroform of crystallization.

*Analysis.*—Calculated for $C_{20}H_{23}N_5O_6S$: C, 52.05; H, 5.02; N, 15.18; S, 6.95. Found: C, 47.04; H, 4.20; N, 13.08. Found in material dried at 110° C. for one hour: C, 52.22; H, 5.42; N, 14.43; S, 7.13 (negative Beilstein test).

(b) *Preparation of di-sodium salt of L-homocysteine*

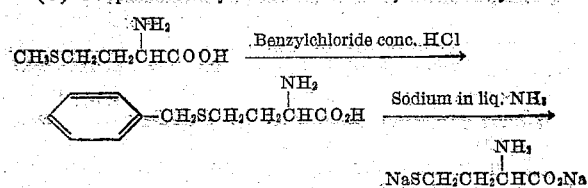

S-benzyl-L-homocysteine was prepared by the method of Dekker and Fruton, J. Biol. Chem., 173, 475 (1948). The product from 50 g. of L-methionine was recrystallized from six l. of boiling water in a 31% yield; M.P. 230–4° dec. $[\alpha]_D +26$ (c. 1.0 in 1.0 N hydrochloric acid).

S-benzyl-L-homocysteine (5.9 g.) was dissolved in 200 ml. of anhydrous liquid ammonia and sodium was added in small pieces with stirring until a permanent blue color was obtained (about 1.20 g. of sodium was required). The solution was then decolorized by the addition of a small amount of S-benzyl-L-homocysteine.

(c) *Preparation of S-adenosyl-L-homocysteine*

To the decolorized solution obtained in accordance with the present example (b) was added 10 g. of 2',3'-isopropylidene-5'-p-toluenesulfonyl adenosine, made in accordance with part (a) of this example. The solution was stirred until the ammonia had evaporated (about three hours). Nitrogen was then passed over the resulting powder for one hour. After cooling in an ice bath, 56 ml. of cold 2 N sulfuric acid was added, giving a cloudy solution that was 1 N with respect to sulfuric acid. The solution was kept at 25° C. for twenty-four hours and then stored at 4° C. overnight. The solution was diluted with an equal volume of water and extracted with two 50 ml. portions of ether. The aqueous layer, after removing the dissolved ether under reduced pressure, was passed through a column containing 500 ml. of Amberlite of IRA-400 resin that was on the hydroxide ion cycle. After washing with water, S-adenosyl-L-homocysteine was eluted with 1 N acetic acid. The eluate having a density greater than 0.20 at 260 mu on the Beckman quartz spectrophotometer when diluted 1 to 100 was lyophilized. The resulting material was dissolved in 90 ml. of water, filtered and cooled overnight at 4° C. The precipitate was collected and dried in vacuo over phosphoric anhydride, wt. 5.60 g., M.P. 210°–216° C. A second crop was obtained from the filtrate by adsorption on IRA-400 resin, elution, lyophylization and crystallization as above, wt. 0.76 g., M.P. 208°–213° C. A sample for analysis was recrystallized twice from water, M.P. 209°–211° C. and dried at 78° C. in vacuo; $\lambda H_2O$ max. 260 mu, E% 418; $[\alpha]_D^{25}$ c. +37 (c. 1.3 in 0.1 N sulfuric acid). Drying the sample at 117° C. (1 mm.) resulted in a further weight loss of 3.3%.

*Analysis.*—Calculated for $C_{14}H_{20}N_6O_5S$: C, 43.7; H, 5.2; N, 21.9; S, 8.3. Found: C, 43.2; H, 5.5; N, 21.8; S, 8.6.

This procedure may be represented by the following reaction:

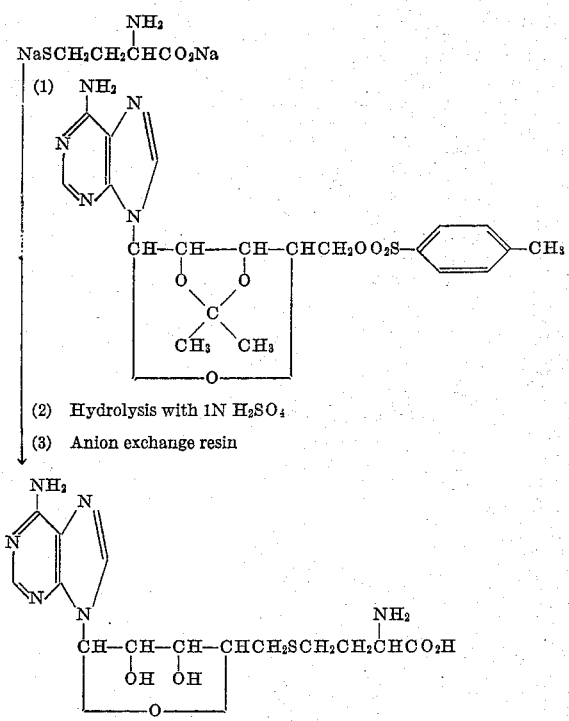

(2) Hydrolysis with 1N $H_2SO_4$
(3) Anion exchange resin

The picrate of S-adenosyl-L-homocysteine was prepared by adding aqueous picric acid to an aqueous solution of S-adenosyl-L-homocysteine. The salt was recrystallized from water; M.P. 175°–177° C.

*Analysis.*—Calculated for $C_{20}H_{23}N_9O_{12}S \cdot H_2O$: C, 38.0; H, 4.0; N, 20.0. Found: C, 38.8; H, 4.3; N, 19.3.

Substantially the same results as in Example I(c) were obtained when the following anion exchange resins were substituted for Amberlite IRA–400:

Amberlite XE–75
Amberlite 98
Dowex–1
Permutit–S

Similarly, the use as an eluant of propionic acid or butyric acid in place of the acetic acid of Example I(c) gave substantially the same results as those noted in Example I(c).

The foregoing illustrates the practice of this invention, which, however, is not to be limited thereby but is to be construed as broadly as permissible in view of the prior art and limited solely by the appended claims.

We claim:
1. The process for making adenosyl homocysteine, which comprises hydrolyzing the reaction product of 2',3'-isopropylidene-5'-p-toluenesulfonyl adenosine and homocysteine, and removing adenosyl homocysteine from the products of hydrolysis by treatment of the latter with an anion exchange substance having a strong basic functional group and eluting adenosyl homocysteine from said substance with a weak acid.
2. The process of claim 1, wherein said homocysteine is used in the form of a di-alkali metal salt.
3. The process of claim 1, wherein said homocysteine is employed in the form of its di-sodium salt.
4. The process of claim 1, wherein said anion exchange substance is an anion exchange resin containing a quaternary amine basic functional group.
5. The process of claim 3, wherein said anion exchange substance is an anion exchange resin containing a quaternary amine basic functional group.
6. The process for making adenosyl homocysteine, which comprises reacting 2',3'-isopropylidene-5'-p-toluenesulfonyl adenosine with the di-sodium salt of L-homocysteine, hydrolyzing the resulting reaction product with a strong mineral acid, contacting the products of hydrolysis with an anion exchange resin having a strongly basic, quaternary amine functional group and being on the hydroxide cycle, and eluting the adenosyl homocysteine from said resin with a weak acid.
7. The process for making adenosyl homocysteine, which comprises reacting 2',3'-isopropylidene-5'-p-toluenesulfonyl adenosine with the di-sodium salt of L-homocysteine, hydrolyzing the resulting reaction product with sulfuric acid, contacting the products of hydrolysis with an anion exchange resin having a strongly basic, quaternary amine functional group and being on the hydroxide cycle, and eluting the adenosyl homocysteine from said resin with acetic acid.

References Cited in the file of this patent

UNITED STATES PATENTS 2,700,038    Lipton et al. _____ Jan. 18, 1955

OTHER REFERENCES

Baddiley et al.: J. Chem. Soc., April 1955, pp. 1085 to 1089.